Aug. 16, 1938. F. A. ISAACSON 2,127,258
BRAKE BEAM SAFETY SUPPORT
Filed Sept. 14, 1936 2 Sheets-Sheet 2
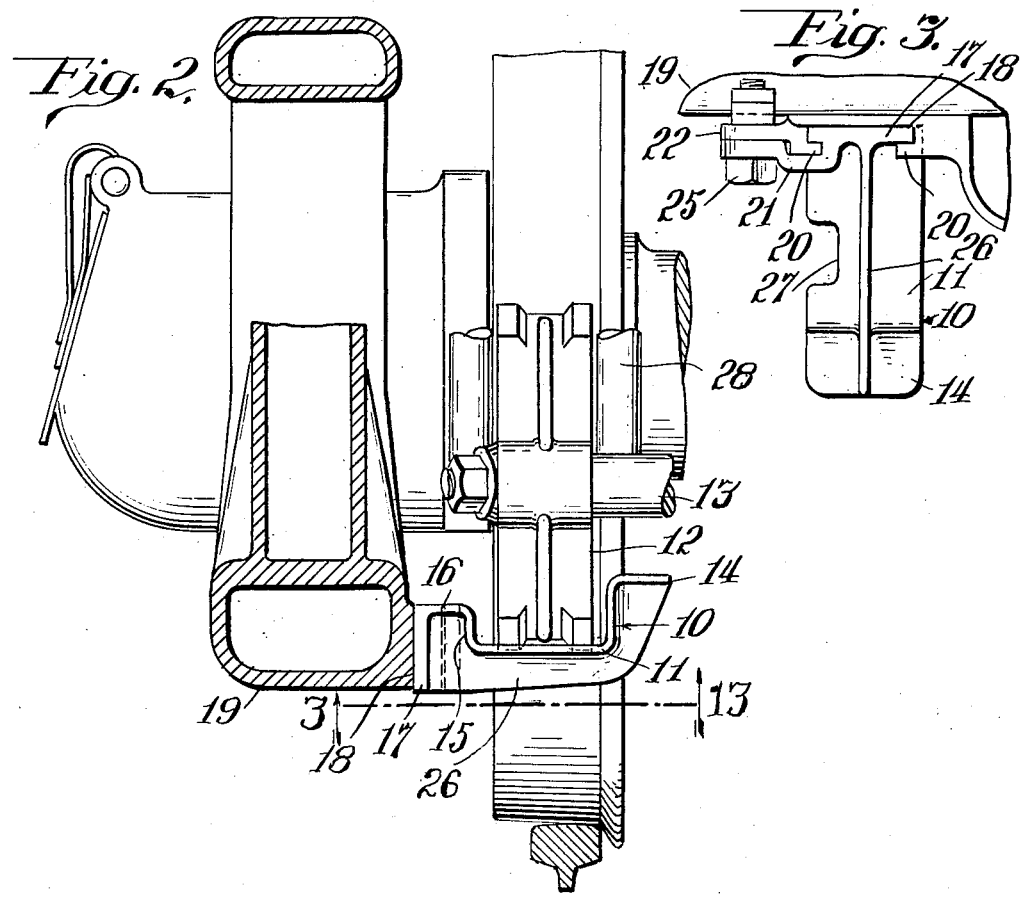
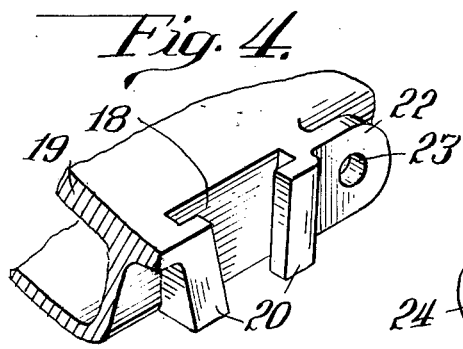
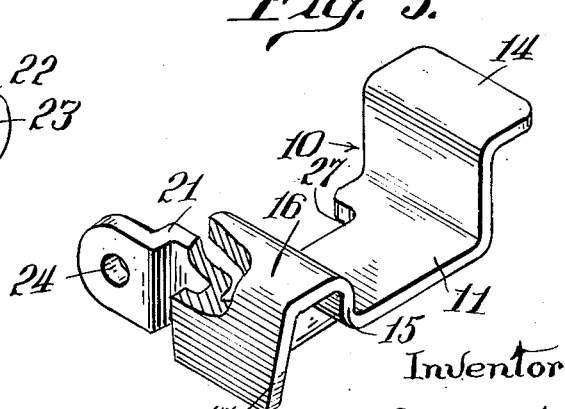
Inventor
Fred A. Isaacson,
By George Heidman
Attorney Patented Aug. 16, 1938

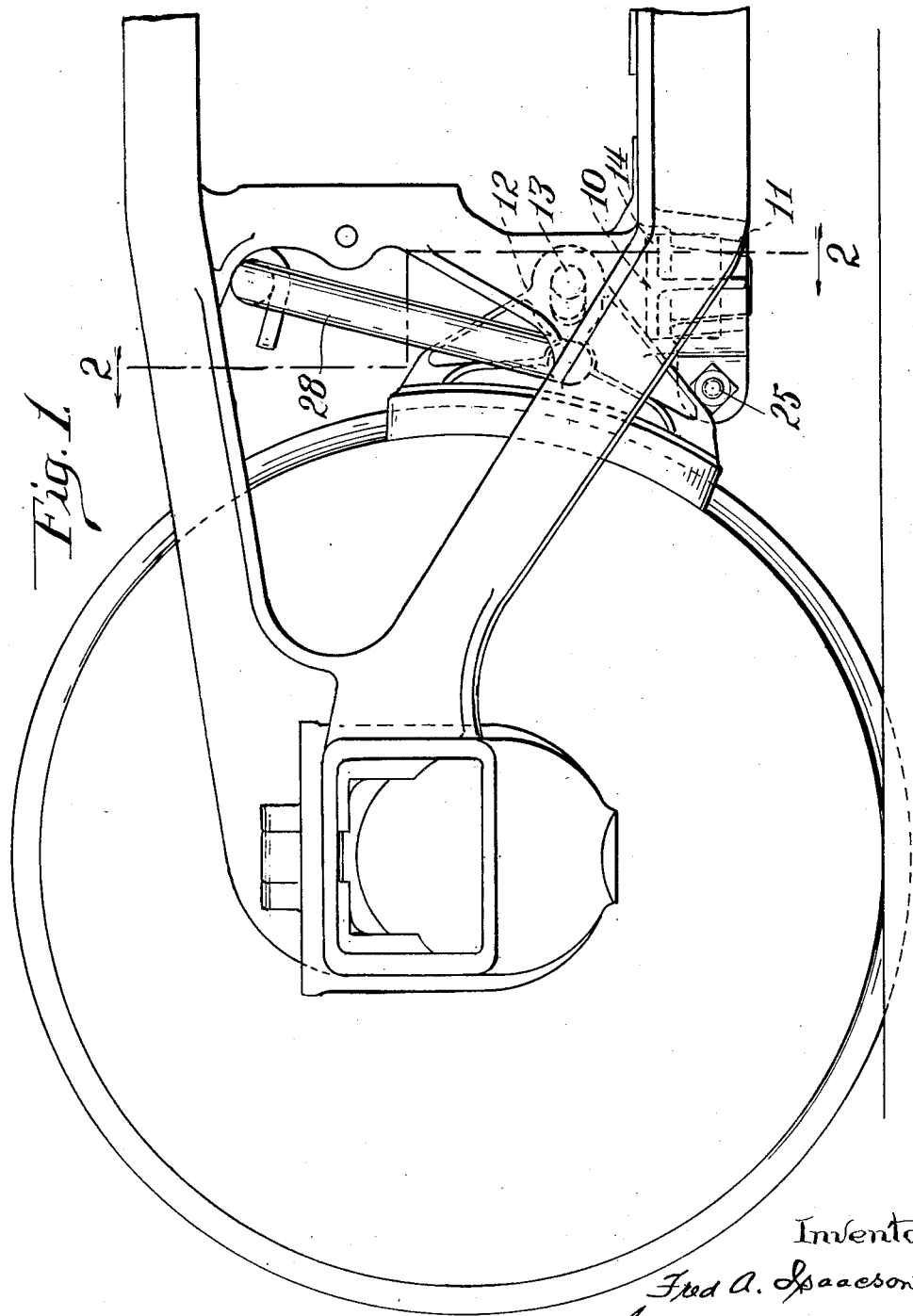

2,127,258

UNITED STATES PATENT OFFICE 2,127,258

BRAKE BEAM SAFETY SUPPORT

Fred A. Isaacson, Topeka, Kans.

Application September 14, 1936, Serial No. 100,696

5 Claims. (Cl. 188—210)

My invention relates to a safety support for the brake beams as generally employed on the trucks of railroad cars or vehicles, as well as on street cars and locomotive tenders, regardless of the motive power; the safety support being adapted for application to the side frame of the truck.

One object of my invention is to provide a support which may be readily as well as removably secured to the side frame of a truck and which is adapted to prevent the brake beam from dropping onto the rails in the event of broken brake beam hangers, worn pins, or failures of other elements of the mechanism whereby the brake beams are normally supported.

The invention contemplates a main element or bracket which will properly support the brake beams,—in the event of failure in the usual beam supporting mechanism,—and prevent the beam from falling onto the tracks where it would be likely to cause a derailment or serious accident.

The invention involves means adapted to be removably secured to the truck side frame in such manner as to extend laterally from the truck side frame in a plane sufficiently beneath the substantially horizontal plane of travel of the brake beam so as to allow proper movement and application of the brake mechanism and also permit of normal wear in the brake beam parts without interfering in any way with the normal functioning of the brake beam.

More specifically stated, the invention involves a horizontally disposed arm or support of sufficient length to extend from the side frame of a truck to which it is secured by suitable means in a manner non-dependent upon any fastening pins or bolts and whereby the weight of the brake beam—in the event of its dropping down—will be transmitted directly to the truck side frame and not to securing bolts.

The objects and advantages of my invention will be readily comprehended from the following detailed description of the accompanying drawings, wherein:

Figure 1 is a side elevation of one end of a truck side frame illustrating the normal position of the brake mechanism and showing in dotted lines the application and positioning of my improved safety support.

Figure 2 is a vertical sectional view taken substantially on the off-set line 2—2 of Figure 1, looking in the direction of the arrows.

Figure 3 is a bottom plan view of the support secured in place, as viewed along the line 3—3 of Figure 2, looking upwardly; only a portion of the side frame being shown and the brake mechanism thereabove being omitted.

Figure 4 is a detail perspective of the bracket formed integral with the truck side frame; and Figure 5 is a perspective view of my improved brake beam support, with a portion broken away and in section to more clearly illustrate construction.

As a result of the constant vibration and jarring to which railroad cars, and particularly freight cars, are subjected, the attachments whereby the brake beams are pendently secured in place, frequently become broken due to wear, thereby allowing the brake beams with the brake heads to drop down onto the rails and into the path of oncoming wheels, resulting in serious accidents and damage.

Supporting mechanisms have been provided for supporting the brake beams in the event of breakage or failure of the usual hanger attachments, but such supporting means have heretofore usually been supported from the more or less occupied spring planks of the trucks which in turn are supported by the side frames.

My present invention contemplates safety means supported entirely from the side frames of the truck and in its specific exemplification involves an arm or bracket member 10, shown in detail in Figure 5, of predetermined length and width.

The member is preferably given the dipped or channel formation indicated at 11 to provide proper clearance around the rear side of the brake head shown at 12, see Figure 2, and secured to the end of the brake beam 13. That is to say, the portion of the bracket or arm intermediate of its ends is dished or channeled so as to fit about and provide proper clearance beneath the rear side of the brake beam head 12 to enable the proper oscillating movement of the brake beam and head during braking application; while the outer or free end 14 of the bracket or support is disposed in a plane above that of the lower end of the brake head into closer proximity with and in a plane beneath that of the brake beam 13, see Figure 2.

The other or attaching end of the bracket or arm 10 is somewhat of inverted U-shape cross section consisting of the upwardly disposed portion 15, the laterally disposed portion 16 and the downwardly disposed leg or portion 17, see Figure 5; and this downwardly disposed leg or portion 17 is tapered or of diminishing width toward the bottom as shown so as to fit into the downwardly tapered slotway 18 formed on the inner side of the lower or bottom member 19 of the truck side frame. The slotway on the inner side of the truck side frame is formed by means of the opposingly disposed lugs 20, 20, see Figure 4, arranged on the inner or wheel side of the truck side frame 19.

The lower ends of the lugs 20, 20 slope toward each other so that the slotway 18 tapers toward the bottom, in a manner similar to the taper of the downwardly disposed leg or portion 17. As is apparent, when the portion 17 is inserted through the upper end of the slotway 18, a wedging holding relation between the bracket or support and the side frame lugs is provided which will firmly hold the bracket in place and transmit all supporting strains (in the event the brake beam 13 drops onto the bracket) to the side frame of the truck.

In order to hold the bracket or support against accidental displacement or removal, I prefer to provide the downwardly disposed portion or leg 17, on its inner side, with an offset and laterally disposed ear or lobe 21 adapted to extend parallel with and adjacent to a boss formation 22 on the truck side frame 19 adjacent to one of the lugs 20, as more clearly shown in Figure 4; the boss 22 and the ear or lobe 21 being each provided with a hole 23 and 24 adapted to register and to receive a suitable bolt as at 25, see Figure 1, whereby all possibility of accidental upward movement of the bracket or arm 10 will be prevented.

In order that the bracket or support may have sufficient strength, I have shown the bottom thereof provided with a reinforcing web or rib as at 26, see Figures 2 and 3, disposed lengthwise of the bracket or arm 10; and one longitudinal side of the support 10 is preferably cut away as at 27, see Figure 3, in order to fit about the inner vertically disposed web portions of the brake head and thus allow the necessary oscillatory movement of the brake head required.

With the bracket or support shaped as shown and heretofore described, it will fit properly about the inner or rear side of the brake head and provide the required clearance for the proper functioning of the brake beam and at the same time afford support for the brake beam at the rear or inside of the bracket head in the event of failure in the brake beam supporting elements. With the bracket or supporting means arranged and formed as herein disclosed and described the bracket will be positioned to receive the dropping brake beam on the comparatively wide flat surface of the free end of the bracket while the intermediate or channeled portion of the bracket will be so positioned relative to the rear side of the brake head that an inward tilting of the brake beam, namely away from the wheels, will be impossible and the brake beam prevented from falling onto the track and lengthwise movement also prevented by the cut away 27 fitting about the vertically extending web portion on the rear side of the brake head.

The bracket or arm is preferably of considerable width and the socket 18 is arranged on the inner face of the truck side frame slightly beyond the usual spring plank receiving opening or window in the side frame so as to dispose the bracket substantially in the same vertical plane of the brake beam and also of the hanger receiving pocket or socket on the truck side frame for the pivot pin or upper end of the hanger, indicated at 28, Figure 1, with the result that the brake beam, in the event of failure of the hanger mechanism, cannot fall toward the rear side of the bracket or arm 10.

The specific exemplification of my invention is readily adapted to the truck side frames at present in use; and while I believe the form shown to be the best embodiment of the invention, certain modifications might be made without, however, departing from the spirit of my invention.

What I claim is:

1. A brake beam safety support comprising, in combination with a truck side frame, a bracket member adapted to extend horizontally from the inner side of the truck side frame in a plane beneath the brake beam, one end of the member having a downwardly disposed tapering portion while the truck side frame on its inner side has a downwardly tapering vertical slotway into which said tapering portion is adapted to slide and thereby removably support the bracket in place and transmit all bearing strains to the side frame, the bracket member also having a laterally extending lobe adapted to receive means for holding the bracket against removal.

2. A brake beam safety support comprising, in combination with a truck side frame provided with a bolt receiving aperture and a pair of opposingly disposed lugs formed to provide a vertical slideway or slot; and a bracket member provided with a downwardly disposed end adapted to fit into said slideway or slot, said end being provided with an apertured lobe adapted to register with the bolt receiving aperture in the side frame.

3. A brake beam safety support comprising, in combination with a truck side frame provided with a pair of opposingly disposed lugs sloping toward each other to provide a vertically disposed tapering slotway; a brake beam suspended between the truck side frames and provided with break-heads at the ends; and a bracket member provided with a downwardly disposed tapering end adapted to fit into said slotway, the intermediate portion of the member being dished to extend in spaced relation about the brake beam head, while the free end of the member is disposed horizontally in a plane beneath the brake beam.

4. In combination with a truck side frame, the lower member whereof is provided with a vertical slot, a brake beam suspended between the truck side frames and provided with break-heads at the ends, a bracket member of channel formation with one end of inverted U-shape formation adapted to fit into the vertical slot of the side frame and having a laterally extending bolt receiving lobe, while the other or free end of the member terminates in a wide horizontally disposed portion arranged in the vertical plane of the brake beam.

5. A brake beam safety support comprising, in combination with a truck side frame provided on its inner side with a pair of opposingly disposed lugs whereby a vertically disposed socket is provided, a bracket member having a dished intermediate portion, one end of the bracket member being vertically disposed and adapted to vertically slide into said socket and thereby removably held in place, and means disposed laterally from said member adjacent said vertically disposed end and adapted to extend substantially parallel with the truck side frame and to be secured thereto.

FRED A. ISAACSON.